J. W. TUFTS.
Last or Form for Shaping Rubber Boots.
No. 226,574. Patented April 13, 1880.
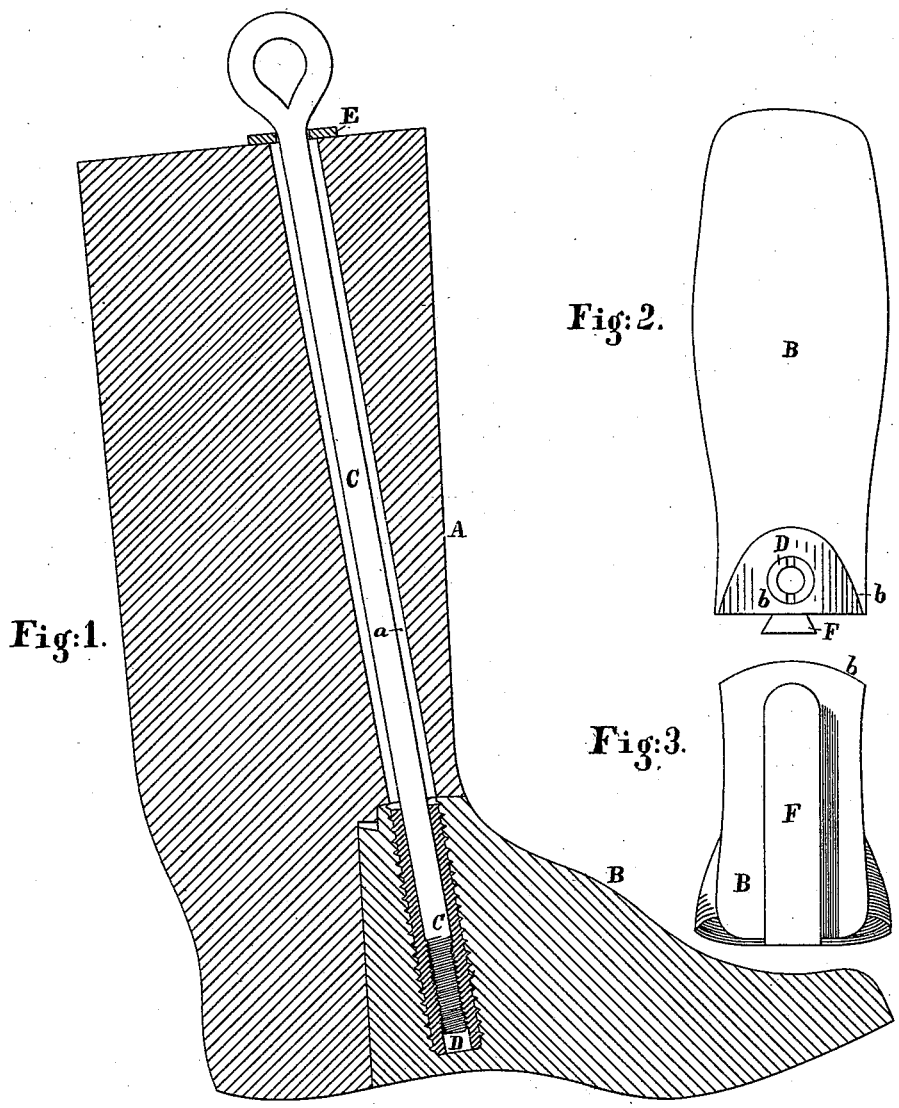

UNITED STATES PATENT OFFICE.

JOSEPH W. TUFTS, OF MALDEN, MASSACHUSETTS.

LAST OR FORM FOR SHAPING RUBBER BOOTS.

SPECIFICATION forming part of Letters Patent No. 226,574, dated April 13, 1880.

Application filed September 13, 1879.

*To all whom it may concern:*

Be it known that I, JOSEPH W. TUFTS, of Malden, Massachusetts, have invented certain Improvements in Lasts or Forms for Shaping Rubber Boots; and I do hereby declare that the same are fully described in the following specification and illustrated in the accompanying drawings.

My improvements are especially adapted for use in the manufacture of rubber boots, where the lasts are, from the nature of the case, subjected to very high temperatures.

The object of my improvement is to promote the efficiency and increase the durability and strength of boot-lasts and forms over which rubber boots are shaped.

My invention is embodied in such boot-last or form consisting of a leg-piece provided with a threaded bolt and a foot-piece formed with a vertical tubular nut engaging with such bolt to unite the parts; also, in such last or form made in two or more parts having the foot-piece rounded or made convex at the top and the corresponding part of the leg-piece concaved to fit the same.

In the drawings, Figure 1 is a vertical section of my improved boot-last. Fig. 2 is a top view of the foot-piece detached, and Fig. 3 is a rear view of the same.

A is the upright part or leg-piece, to which the foot B is secured by the bolt C and tubular nut D. This nut is a peculiar feature of my invention. It is threaded on its entire periphery, and is screwed down into the foot-piece, so as to be firmly united thereto, and at the same time it tends to keep the wood from splitting. The nut is nicked or slotted at the upper end, so as to be readily inserted by means of a screw-driver or other instrument engaging with the nicks.

Within the nut is a female screw engaging with the threaded tip of the bolt C. This bolt passes loosely down through a hole, $a$, in the leg A, and through a washer, E, or other bearing-plate at the top of the last. When the bolt is screwed into the nut the parts A and B are thereby drawn and held close together.

Nuts for this purpose have heretofore been inserted horizontally from the rear of the foot-piece, and secured in such position by a wedge or plug, as described and shown in Patent No. 170,462, granted to Badger November 30, 1875. These horizontal apertures have been of rectangular form in cross-section, and the nuts of corresponding shape to fit the apertures; but it has been a difficult and expensive matter to locate them correctly with reference to the position of the rod C.

By my invention the nut is inserted vertically, or nearly so, in an aperture which is a prolongation of the hole $a$, and hence the bolt and nut will always readily engage, the strains will be direct, and the last will be at once cheapened and perfected.

I expressly disclaim the form of nut set forth in the Badger patent and the mode of inserting and securing the same therein described.

A weakness in lasts for rubber boots as ordinarily constructed is, that the upper corners of the foot-piece where it meets the leg-piece are very liable to chip off with use, since the heat of vulcanizing renders the wood brittle and apt to split off at these exposed places. I have remedied this difficulty by beveling or curving the upper surface of the rear part of the foot-piece, especially along and near the corners lettered $b$ in Figs. 2 and 3, so as to render the angles $b$ quite obtuse. The wood is therefore far less likely to split off and the term of usefulness of the last is materially lengthened.

The curve or bevel given to the surface or angles of this part of the foot-piece is reproduced in the corresponding part of the leg-piece, which is shaped to fit over and upon it, with a concavity where the adjacent part of the foot-piece is convex or crowning. In such case the prominent angles of that part of the leg-piece would not be likely to chip off, since they stand in the direction of the grain of the wood.

A peculiarity of my last consists in providing a dovetail joint along the vertical line of junction of the foot-piece and leg-piece. Heretofore these parts have had plane surfaces only, or have been formed with a simple tongue and groove.

An advantage of the dovetail joint is, that by it the parts may be temporarily held in close proximity while the holes are bored for the insertion of the bolt and nut. A correct relative position of the parts is thus secured, so that the nut will stand in the right direction to receive the bolt. The foot and leg will also be held in place after the bolt is removed.

The various features of my invention are equally applicable to boot-trees in which the leg part is in two, three, or more pieces.

I claim as of my invention—

1. In a last or form for shaping rubber boots, the leg A, having a threaded bolt, C, passing loosely through it longitudinally, in combination with the foot-piece B, provided with a tubular nut, D, inserted vertically, and secured in position by means of its external threads, and threaded internally for engagement with the bolt C, substantially as and for the purposes set forth.

2. In a last or form for shaping rubber boots, a leg-piece forming the leg and heel of the last, perforated vertically to receive the connecting-bolt, and cut away in front with a concave under surface, in combination with a foot-piece convex on its upper surface and provided with a tubular nut inserted vertically through such convex surface, substantially as and for the purposes set forth.

JOSEPH W. TUFTS.

Witnesses:
A. H. SPENCER,
E. A. PHELPS.